United States Patent
Lai

(10) Patent No.: US 10,414,460 B1
(45) Date of Patent: Sep. 17, 2019

(54) COLLAPSIBLE HANDLEBAR OF A BICYCLE

(71) Applicant: AZURE BIKE INTERNATIONAL LTD., Taichung (TW)

(72) Inventor: Yen-Pin Lai, Taichung (TW)

(73) Assignee: AZURE BIKE INTERNATIONAL LTD., Taichung (TW)

(*) Notice: Subject to any disclaimer, the term of this patent is extended or adjusted under 35 U.S.C. 154(b) by 0 days.

(21) Appl. No.: 16/262,840

(22) Filed: Jan. 30, 2019

(51) Int. Cl.
  *B62K 21/26* (2006.01)
  *B62K 21/16* (2006.01)

(52) U.S. Cl.
  CPC ................... *B62K 21/16* (2013.01)

(58) Field of Classification Search
  CPC ...... B62K 21/12; B62K 21/125; B62K 21/16; B62K 21/18; B62K 21/22; B62K 21/24
  See application file for complete search history.

(56) References Cited

U.S. PATENT DOCUMENTS

| | | | | | |
|---|---|---|---|---|---|
| 527,576 | A | * | 10/1894 | Woodard | B62K 21/16 74/551.5 |
| 560,700 | A | * | 5/1896 | Fisher | B62K 21/16 74/551.4 |
| 5,133,224 | A | * | 7/1992 | Prins | B62K 21/16 74/551.1 |
| 5,431,507 | A | * | 7/1995 | Smilanick | B62K 15/00 280/287 |
| 5,586,652 | A | * | 12/1996 | Smilanick | B62K 15/00 190/109 |

FOREIGN PATENT DOCUMENTS

DE  19858032 A1 * 6/2000 ............ B62K 11/14

* cited by examiner

*Primary Examiner* — Adam D Rogers
(74) *Attorney, Agent, or Firm* — Bruce Stone LLP; Joseph Bruce

(57) ABSTRACT

A collapsible handlebar for use on a bicycle includes a ferrule, two tubes and two beams. The ferrule is operable to hold a stem of a fork of the bicycle. Each of the tubes includes an internal end. Each of the beams includes a supportive end for supporting one of the tubes and a connective end pivotally connected to the ferrule. Thus, the beams are movable relative to each other between a close position and a distant position. The internal ends of the tubes are located near and connected to each other when the beams are in the close position.

10 Claims, 7 Drawing Sheets

COLLAPSIBLE HANDLEBAR OF A BICYCLE

BACKGROUND OF INVENTION

1. Field of Invention

The present invention relates to a bicycle and, more particularly, to a collapsible handlebar of a bicycle.

2. Related Prior Art

A bicycle includes a frame and a fork. The frame includes a head tube. The fork includes a stem rotationally inserted in the head tube. A handlebar is connected to the stem.

Conventionally, the frame and the handlebar are not collapsible. Accordingly, the bicycle is not collapsible and occupies a lot of space when it is parked or stored.

In some cases, the frame is collapsible but the handlebar is not collapsible. Thus, the bicycle is collapsible and occupies less space when it is parked or stored. However, the collapsed bicycle still occupies quite some space because the handlebar is not collapsible.

The present invention is therefore intended to obviate or at least alleviate the problems encountered in prior art.

SUMMARY OF INVENTION

It is the primary objective of the present invention to provide a bicycle with a collapsible handlebar.

To achieve the foregoing objective, the collapsible handlebar for use on a bicycle includes a ferrule, two tubes and two beams. The ferrule is operable to hold a stem of a fork of the bicycle. Each of the tubes includes an internal end. Each of the beams includes a supportive end for supporting one of the tubes and a connective end pivotally connected to the ferrule. Thus, the beams are movable relative to each other between a close position and a distant position. The internal ends of the tubes are located near and connected to each other when the beams are in the close position.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
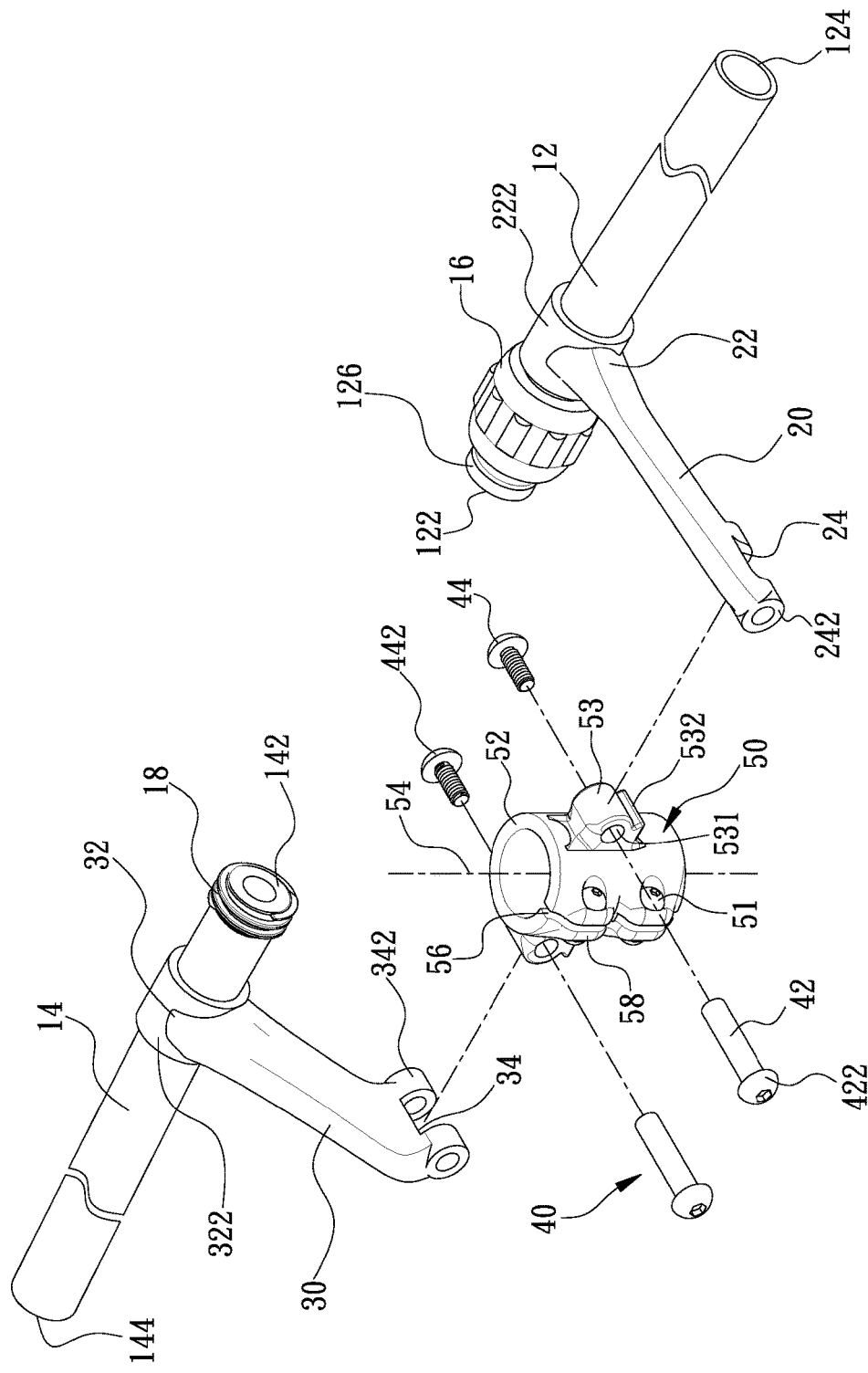
FIG. 1 is an exploded view of a collapsible handlebar according to the preferred embodiment of the present invention.
Figure 2:
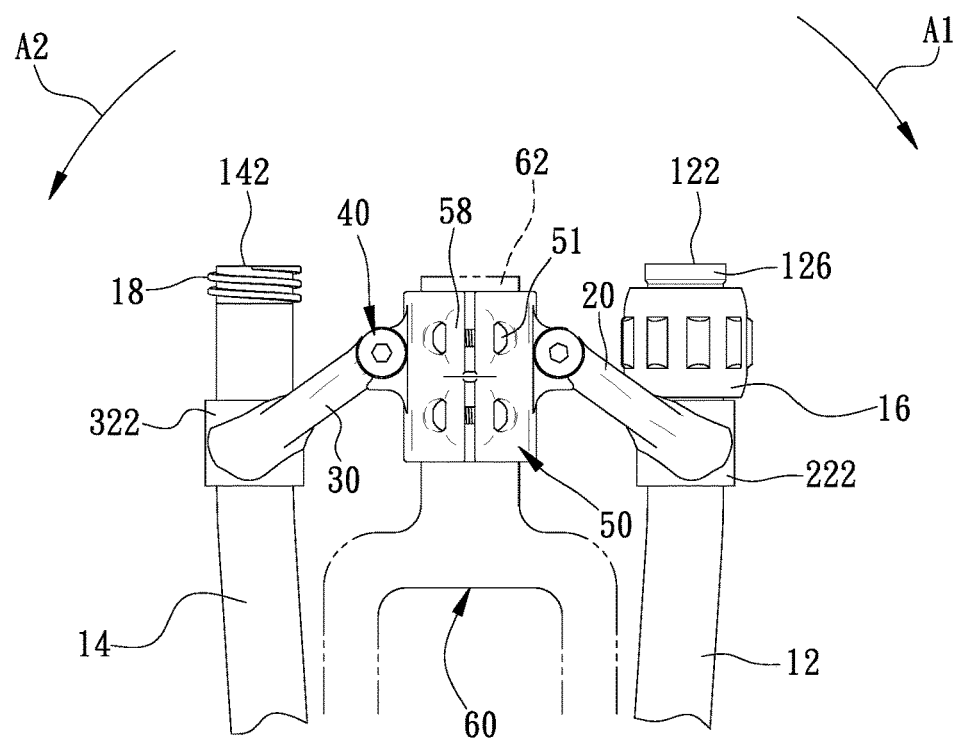
FIG. 2 is a partial and rear view of the collapsible handlebar shown in FIG. 1, in a collapsed position.
Figure 3:
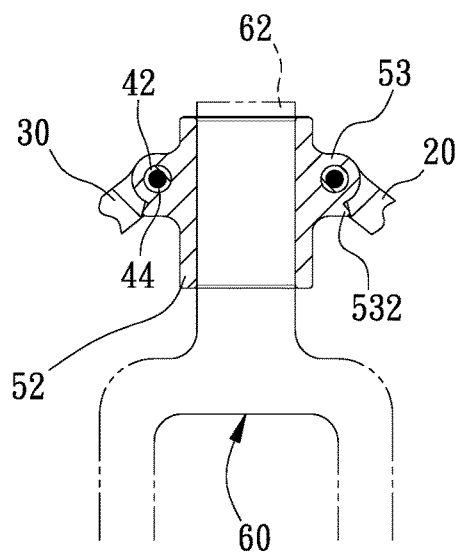
FIG. 3 is a partial and cross-sectional view of the collapsible handlebar shown in FIG. 2.

Referring to FIGS. 1 to 3, a collapsible handlebar includes two tubes 12 and 14, two beams 20 and 30, two connectors 40 and a ferrule 50 according to the preferred embodiment of the present invention.

The tube 12 includes an internal end 122, an external end 124 and an enlarged portion 126. The enlarged portion 126 is formed with an external diameter that gets larger as the enlarged portion 126 extends toward the internal end 122.

Figure 6:
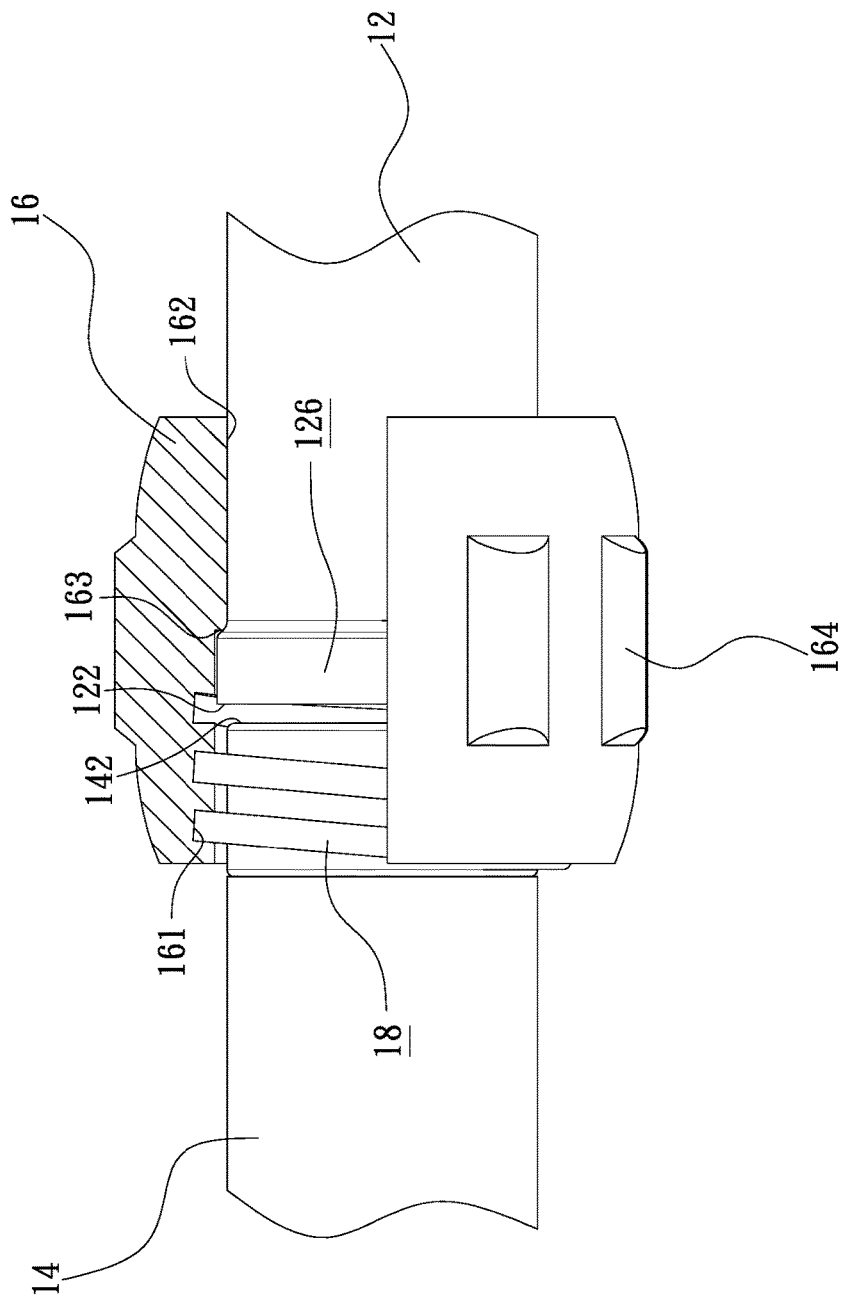
FIG. 6 is an enlarged, partial and cross-sectional view of the collapsible handlebar shown in FIG. 5.

Referring to FIGS. 1 and 6, a knob 16 is a tubular element rotationally supported on the tube 12. The knob 16 includes skid-proof portions 164 such as ribs formed on an external face thereof. The knob 16 is formed with a screw hole 161, a smaller smooth bore 162 and an annular shoulder 163 between and the screw hole 161 and the smooth bore 162.

Figure 4:
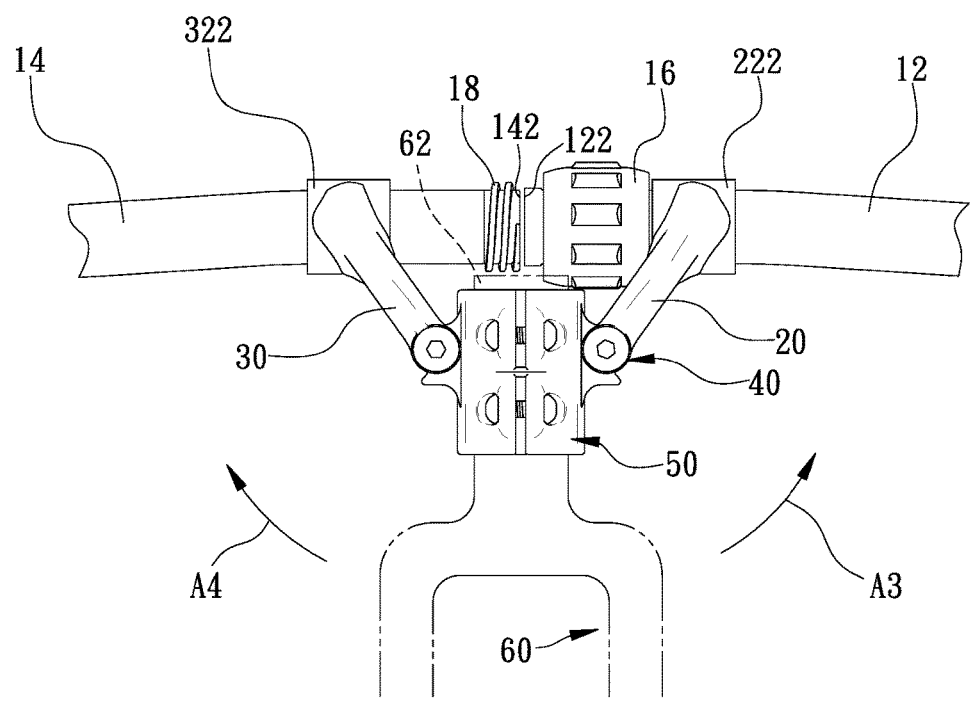
FIG. 4 is a partial view of the collapsible handlebar shown in FIG. 1, in an extended position.

The tube 14 is formed with an internal end 142 and an external end 144. The internal ends 122 are closer to each other than the external ends 124 and 144 are when the collapsible handlebar is in an extended position (FIG. 4).

A thread 18 extends on the tube 14 near the internal end 142. The thread 18 is shaped in compliance with the screw hole 161.

The beams 20 and 30 are formed as mirror images of each other. The beam 20 includes a supportive end 22 and a connective end 24. The supportive end 22 supports the tube 12.

The beam 30 is formed with a supportive end 32 and a connective end 34. The supportive end 32 supports the tube 14.

The connective ends 24 and 34 are pivotally connected to the ferrule 50. Thus, the beams 20 and 30 are pivoted relative to each other between a close position and a distant position. The collapsible handlebar is in the extended position as the beams 20 and 30 are in the close position. The collapsible handlebar is in the collapsed position as the beams 20 and 30 in the distant position.

The internal end 122 of the first tube 12 is located close to the internal end 142 of the second tube 14 as the beams 20 and 30 are in the close position. The internal end 122 of the first tube 12 is located far from the internal end 142 of the second tube 14 as the beams 20 and 30 are moved to the close position as indicated by arrow heads A1 and A2. The combination of the beam 20 with the tube 12 can be located on a side of the ferrule 50 and the combination of the beam 30 with the tube 14 can be located on another side of the ferrule 50.

The beam 20 includes a collar 222 formed at the supportive end 22 and two rings 242 formed at the connective end 24. An axis of the collar 222 extends substantially perpendicular to a length of the beam 20. An axis of the rings 242 extends substantially parallel to the length of the beam 20.

The tube 12 includes a portion inserted in and connected to the collar 222 by welding for example. Thus, the tube 12 is not rotatable relative to the beam 20.

The beam 30 includes a collar 322 formed at the supportive end 32 and two rings 342 formed at the connective end 34. An axis of the collar 322 extends substantially perpendicular to a length of the beam 30. An axis of the rings 342 extends substantially parallel to the length of the beam 30.

The tube 14 includes a portion inserted in and connected to the collar 322 by welding for example. Thus, the tube 14 is not rotatable relative to the beam 30.

Each of the connectors 40 includes a threaded sleeve 42 and a threaded bolt 44. The threaded sleeve 42 includes an open end, a closed end, a head 422 formed at the closed end, and a thread (not numbered) extending on an internal face. The threaded bolt 44 includes a head 442 formed at an end and a thread (not numbered) extending around the periphery thereof.

The ferrule 50 is a C-shaped element that extends about an axis 54. The ferrule 50 includes two C-shaped edges 52 and two rectilinear edges (not numbered). There is a gap 56 between the rectilinear edges. The ferrule 50 further includes two lugs 53 formed on two sides thereof. Each of the lugs 53 includes an aperture 531 in an upper portion and a stop 532 on a lower portion. The ferrule 50 further includes at least one protuberance 58 formed near each of the rectilinear edges. Preferably, two protuberances 58 are formed near each of the rectilinear edges.

One of the lugs 53 (the "right lug") is located between the rings 242. The threaded sleeve 42 of one of the connectors 40 (the "first connector") is inserted in the rings 242 and the left lug 53 before it is engaged with the threaded bolt 44 of the first connector 40. Thus, the beam 20 is pivotally connected to the ferrule 50. The rings 242 are located between the heads 422 and 442 of the first connector 40.

The remaining one of the lugs 53 (the "left lug") is located between the rings 342. The threaded sleeve 42 of the remaining one of the connectors 40 (the "second connector") is inserted in the rings 342 and the left lug 53 before it is engaged with the threaded bolt 44 of the second connector 40. Thus, the beam 30 is pivotally connected to the ferrule 50. The rings 342 are located between the heads 422 and 442 of the second connector 40.

Figure 9:
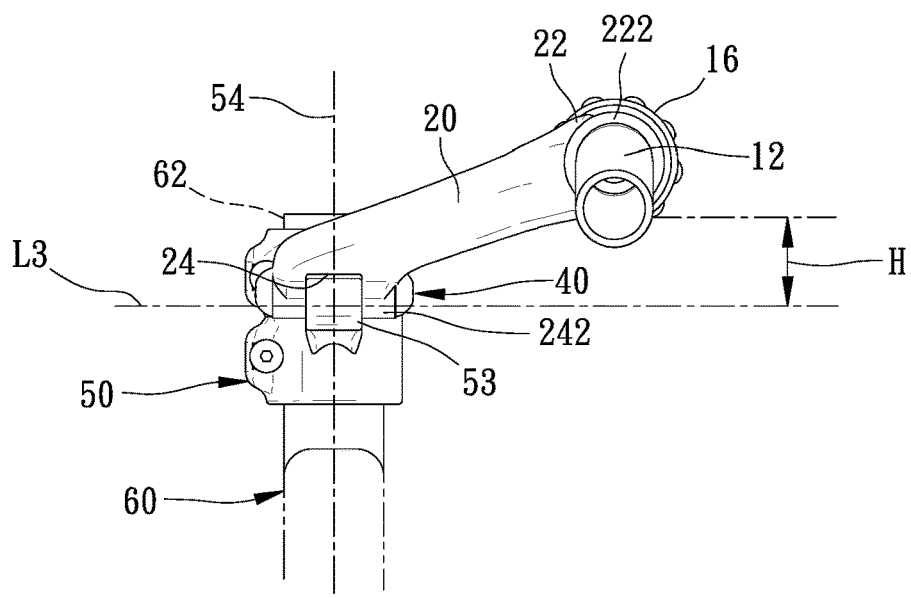
FIG. 9 is a partial and left view of a bicycle equipped with the collapsible handlebar shown in FIG. 7.

Referring to FIG. 9, there is shown a fork 60 of a bicycle. The fork 60 includes a stem 62 pivotally inserted in a head tube of a frame of the bicycle. The ferrule 50 is located on and around the stem 62. Two fasteners 51 are inserted in the protuberances 58 to bring the rectilinear edges of the ferrule 50 toward each other, thereby rendering the ferrule 50 tight on and around the stem 62. Thus, the ferrule 50 is connected to the stem 62, avoiding their movement relative to each other.

Referring to FIGS. 2 and 3, the collapsible handlebar is in the collapsed position as the beams 20 and 30 in the distant position. The tubes 12 and 14 respectively hang on the beams 20 and 30, which are supported on the fork 60. The stops 532 abut against the beams 20 and 30, respectively, thereby keeping the fork 60 from the tubes 12 and 14 from the fork 60.

Referring to FIG. 4, the collapsible handlebar is moved to the extended position as the beams 20 and 30 are pivoted to the close position as indicated by arrowheads A3 and A4. The internal end 122 of the first tube 12 is located very close to the internal end 142 of the second tube 14.

Figure 5:
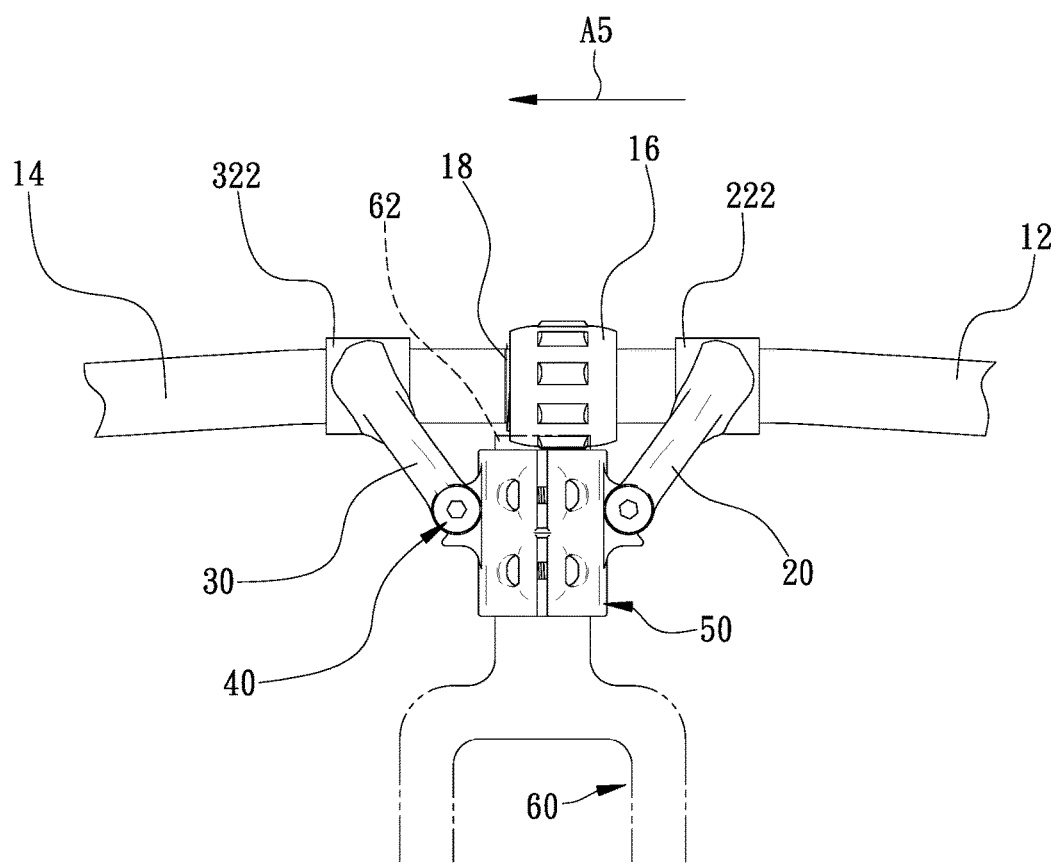
FIG. 5 is a partial view of the collapsible handlebar in another position than shown in FIG. 4.
Figure 7:
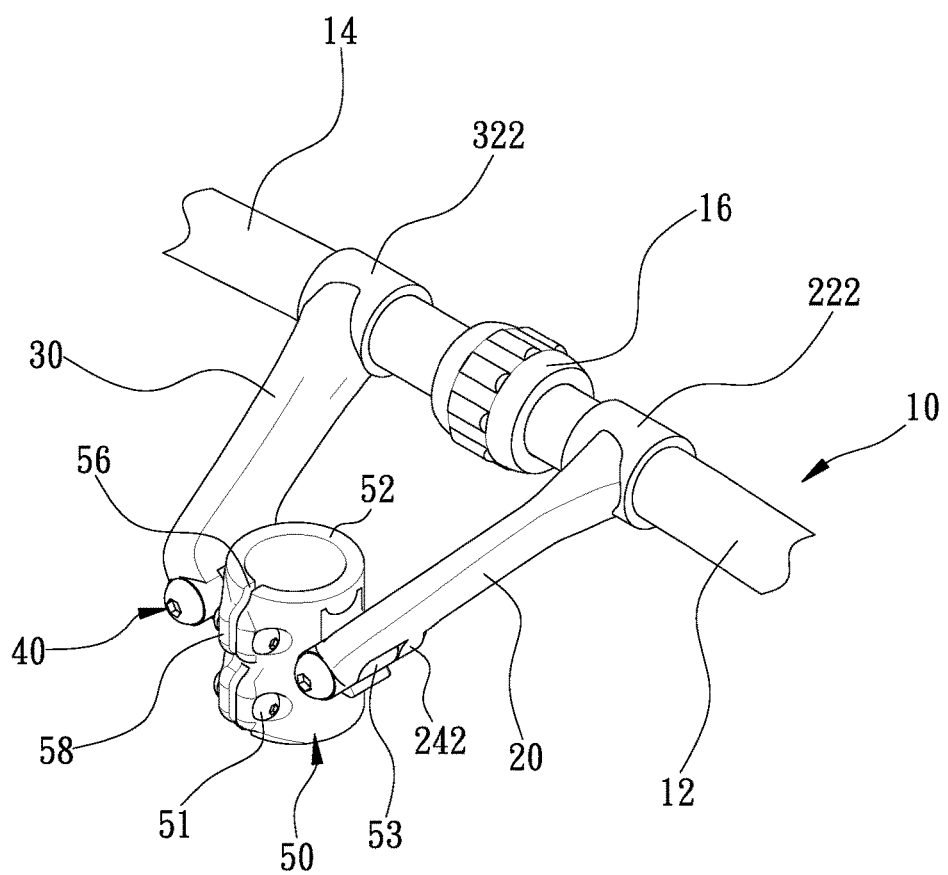
FIG. 7 is a perspective view of the collapsible handlebar shown in FIG. 2.

Referring to FIGS. 5 through 7, the collapsible handlebar 10 is kept in the extended position. The knob 16 is rotated in a direction relative to the tube 14 so that the screw hole 161 receives the thread 18. The annular shoulder 163 abuts against the enlarged portion 126, thereby pushing the internal end 122 of the tube 12 toward the internal end 142 of the tube 14 as indicated by an arrowhead A5. The internal end 122 of the tube 12 gets closer to the internal end 142 of the tube 14 as the thread 18 gets tighter in the screw hole 161.

Figure 8:
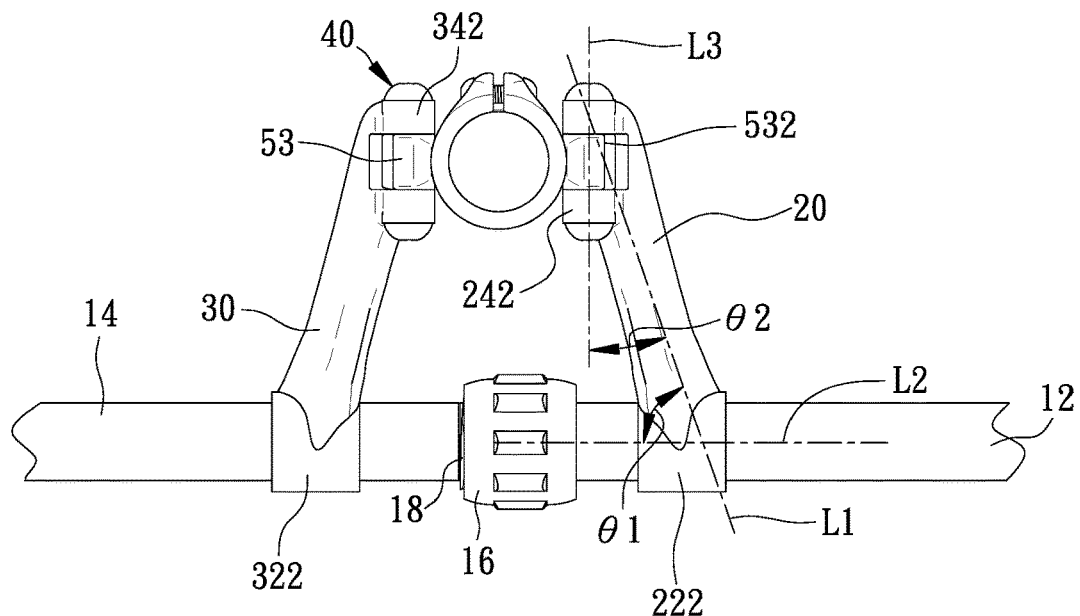
FIG. 8 is a top view of the collapsible handlebar of FIG. 7.

Referring to FIG. 8, the beam 20 (or 30) extends along a length L1. The collar 222 (or 322) extends around an axis L2. The tube 12 (or 14) extends along the axis L2 of the collar 222 (or 322). There is an angle $\theta 1$ between the length L1 and the axis L2. The rings 242 (or 342) and the right (or left) lug 53 extend about an axis L3. There is an angle $\theta 2$ between the length L1 and the axis L3. The angle $\theta 1$ is larger than the angle $\theta 2$.

Referring to FIG. 9, the bottom of the knob 16 is located at a height H above the axis L3.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A collapsible handlebar for use on a bicycle, the collapsible handlebar comprising:
   a ferrule operable to hold a stem of a fork of the bicycle;
   a first tube comprising an internal end;
   a second tube comprising an internal end;
   a first beam comprising a supportive end for supporting the first tube and a connective end pivotally connected to the ferrule; and
   a second beam comprising a supportive end for supporting one of the second tube and a connective end pivotally connected to the ferrule;
   wherein the first and second beams are movable relative to each other between a connected position and a separated position, wherein the internal ends of the first and second tubes are connected to each other when the first and second beams are in the connected position relative to each other.

2. The collapsible handlebar according to claim 1, comprising a knob rotationally supported on the first tube and internally formed with a screw hole, wherein the second tube comprises a thread inserted in the screw hole of the knob, thereby keeping the collapsible handlebar in an extended position.

3. The collapsible handlebar according to claim 2, wherein the knob comprises an annular shoulder formed on an internal face, the first tube comprises an enlarged portion formed on an external face, and the annular shoulder abuts against the enlarged portion to bring the internal ends of the first and second tubes toward to each other.

4. The collapsible handlebar according to claim 3, wherein the internal ends of the first and second tubes get closer to each other as the thread gets tighter in the screw hole.

5. The collapsible handlebar according to claim 1, wherein each of the first and second beams comprises two rings, and the ferrule comprises two lugs each of which is located between and connected to the rings of one of the first and second beams.

6. The collapsible handlebar according to claim 5, wherein each of the lugs comprises a stop formed thereon and operable to abut against one of the first and second beams thereby keeping the beams from the fork.

7. The collapsible handlebar according to claim 5, comprising two connectors for connecting the rings to the lugs.

8. The collapsible handlebar according to claim 7, wherein each of the connectors comprises a threaded sleeve engaged with a threaded bolt.

9. The collapsible handlebar according to claim 5, wherein each of the first and second beams comprises a collar formed at the supportive end and located around one of the first and second tubes.

10. The collapsible handlebar according to claim 9, wherein each of the first and second beams extends along a length, the collar of each of the first and second tubes extends about a first axis, the rings of each of the first and second beams extend about a second axis, and an angle between the first axis and the length is larger than an angle between the second axis and the length.

* * * * *